BARON EMMANUEL COPPENS D'EECKENBRUGGE.
FISHING TACKLE.
APPLICATION FILED MAR. 16, 1920.
1,405,300.
Patented Jan. 31, 1922.
2 SHEETS—SHEET 2.
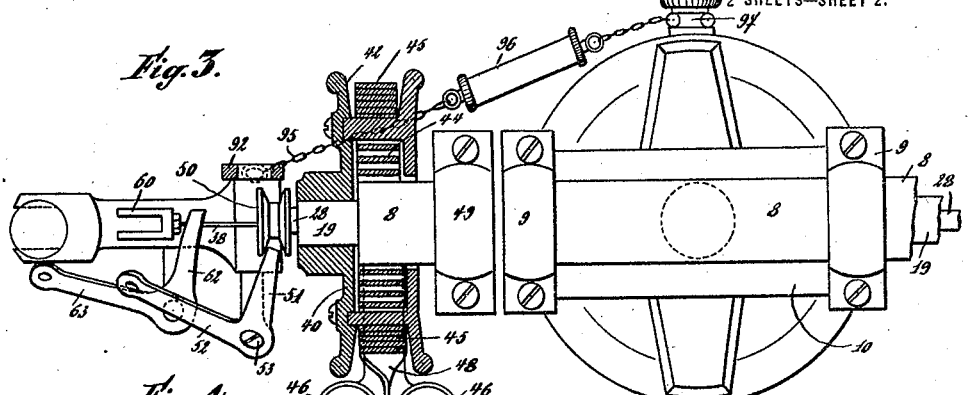
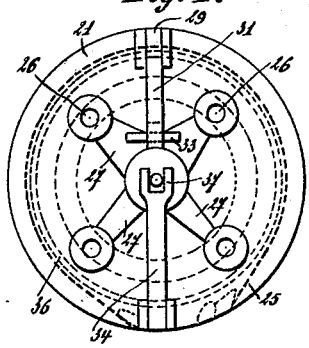
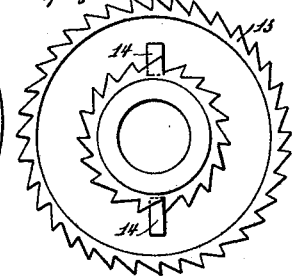
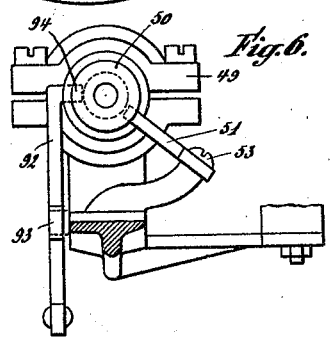
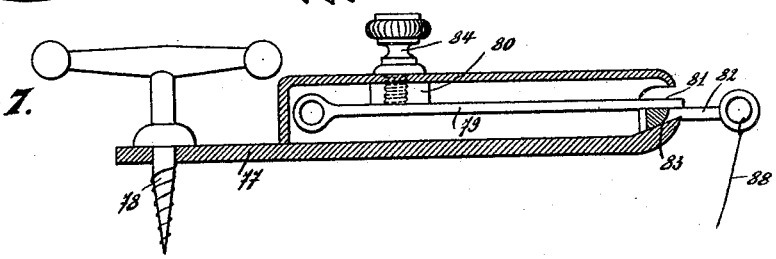
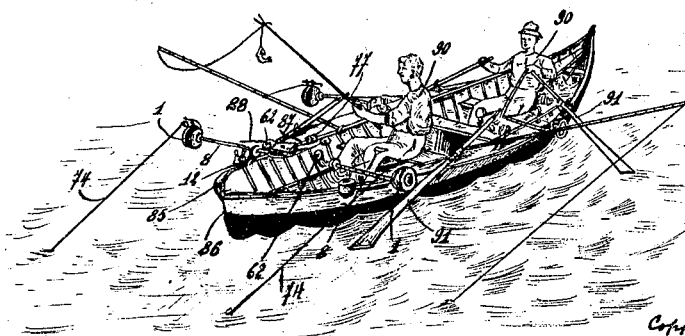
Inventor
Baron Emmanuel
Coppens d'Eeckenbrugge
By
Rosenbaum Stockridge & Borst
Attys.

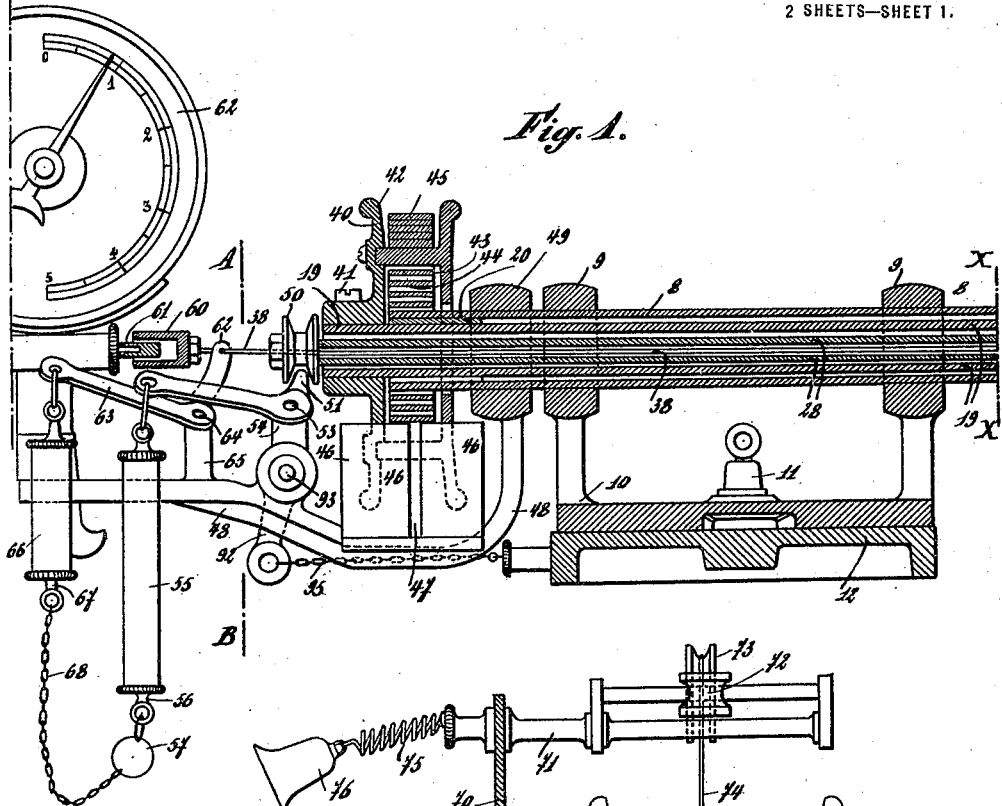
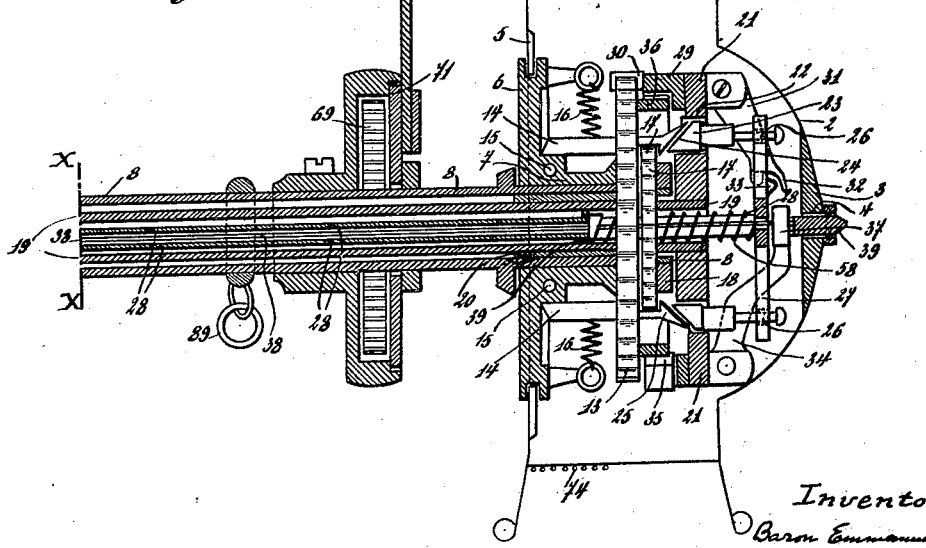

UNITED STATES PATENT OFFICE.

BARON EMMANUEL COPPENS D'EECKENBRUGGE, OF BRUSSELS, BELGIUM.

FISHING TACKLE.

1,405,300. Specification of Letters Patent. Patented Jan. 31, 1922.

Application filed March 16, 1920. Serial No. 366,244.

*To all whom it may concern:*

Be it known that I, BARON EMMANUEL COPPENS D'EECKENBRUGGE, a subject of King of Belgium, residing at Brussels, in the Kingdom of Belgium, have invented certain new and useful Improvements in Fishing Tackle, of which the following is a specification.

My invention relates to an apparatus adapted to be used as fishing tackle and more particularly in the so called "trolling" in which, as it is well known a cord is let off or dropped from a moving bark or boat.

The essential object of my invention is to secure a mechanical apparatus or device adapted to perform all the necessary operations such as launching of the cord, determining the depth of the water in which it is desired to fish (the device being used as a sounding-lead with the bark at rest), winding up of the cord and varying its immersed length according to the necessities of the fishing operation, without the fisher being obliged to give up the oars.

With this object in view my invention essentially consists in special combinations and arrangements of parts as will be hereinafter fully described and pointed out in the appended claims.

Referring to the annexed drawings which show as an example, an apparatus constructed according to my invention:

Fig. 1 is a vertical longitudinal section of a first part of the apparatus.

Fig. 2 is a vertical longitudinal section of the second part of the apparatus complementary to the part shown in Fig. 1, the whole apparatus being composed of the said two parts and having been divided for the purpose of illustration along the section line X X in Figs. 1 and 2.

Fig. 3 is a top view, partially in section, of the part of the apparatus shown in Fig. 1.

Fig. 4 is a front view of a cross-piece used as a clutch controlling means in the part of the apparatus shown in Fig. 2.

Fig. 5 is a front view of a combination of two ratchet-wheels cooperating also with the part of the apparatus shown in Fig. 2.

Fig. 6 shows a detail, said view corresponding to a section taken on line A—B Fig. 1.

Fig. 7, is a sectional view of an auxiliary device cooperating with the apparatus shown in Figs. 1 and 2.

Fig. 8 is a diagrammatical view showing four apparatuses fixed to a bark and allowing the control of four cords by two fishers without necessity for them to give up the oars.

1 (Fig. 2) is a drum or spool around which the fishing cord is wound up. This drum or spool, which may be constructed in sheet metal, is provided on one side with a spherical part 2 strengthened by a welded ring 3 which is fitted at its centre with a square hole 4 and on the opposite side with a ring 5 by aid of which the spool or drum can be readily attached or removably fixed to a plate 6 forming a nave 7 adapted to rotate freely on a tubular frame 8 (Figs. 1 and 2) supported in two bearings 9 (Fig. 1) in one piece with a puppet 10 fixed at its centre on a bracket 12 by aid of a bolt 11. The nave 7 (Fig. 2) is bodily connected to a ratchet wheel 13 through which two pawls 14 are passed in the central part, in suitable openings and the said pawls are pivoted at 15 on the nave 7; they are subjected to the pressure of springs 16 by which they are pressed down between the teeth of a ratchet-wheel 17, the teeth of which are cut in a direction opposite to the direction of the teeth of the ratchet-wheel 13 (Fig. 5). The said ratchet-wheel 17 is firmly secured or keyed on the end of the tubular frame 8 on which it is held by a nut 18.

In the tubular frame 8 is passed a tubular shaft 19 adapted to rotate in end sleeves or bushes 20. The tubular shaft 19 carries, inside of the spherical part 2 of the spool 1, a plate 21 having a groove 22 in which a ring 23 is placed, said ring being provided with an annular conical face 24 arranged in front of corresponding conical ends 25 terminating the pawls 14.

The said ring 23 is fitted on its face, opposite to the conical face 24, with four pins 26 passing through holes in the ends of the arms 27 of a cross piece which is mounted at the end of a second tubular shaft or rod 28 located within the tubular shaft 19 concentrically to said shaft.

The plate 21 carries on a pivot mounted in suitable lugs projecting from the side face of the plate, a pawl 29 of angular shape, engaging with its end 30 (Fig. 2)

between the teeth of ratchet-wheel 13, the angular arm 31 of said pawl ending in a hook or fork 32 in which is engaged a cross-bar 33 bridging two of the arms 27 (Figs. 2 and 4). The said plate 21 also carries, cymmetrically to the pawl 29, an arm 34 also of angular or bell-crank shape the end of which is connected to a brake band 35 surrounding an annular flange 36, projecting laterally from the ratchet-wheel 13.

The angular arm 34 is provided, at its other end with a fork 37 (Figs. 2 and 4) adjacent to the cross-piece 27 and through which the end of a rod 38 is passed, said rod passing centrally within the tubular shaft or rod 28. The said rod 38 ends, in its part adjacent to the fork 37, in a square part 39 fitting into the opening 4 of the ring 3 strengthening the spherical part 2 of the spool 1.

The parts just described, which are all contained within the central part of the spool 1 cooperate with said spool as a clutching member (1) to connect or disconnect the same with or from its actuating means, (2) to stop the rotation of the spool at any desired moment during the winding off of the cord and (3) to actuate a meter controlling the length of the unwound angle.

To accomplish these functions, the parts above described cooperate with the following mechanical elements:

The tubular shaft 19 on which the plate 21 (Fig. 2) is mounted, carries outside of the tubular frame 8, in the part adjacent to the puppet 10 (Fig. 1) a pulley 40 which is fixed on the end of the shaft by means of a set screw 41.

This pulley 40, which is provided at its periphery with a groove 42, forms in its central part a barrel or spring box 43 containing a spiral spring 44 attached at one end to the tubular frame 8 which extends within the pulley and at the other end to the internal periphery of the barrel 43.

In the example shown, the said spring is wound so as to be put under tension by a pull on a strap or band 45 placed in the groove 42 when the pulley is rotated in a direction away from the spectator facing the apparatus. The strap 45 after its passage around the groove of the pulley, is conducted between two guides 46, in the form of rollers or cylinders, leaving between them a space 47 (Figs. 1 and 3) corresponding substantially to the thickness of the strap.

These guides are carried by an arm 48 depending from a bracket 49 fixed on the tubular frame 8 adjacent to the bearing 9 of puppet 10. The length of the strap is such that the spring 44 can be put under tension by a rotation of the pulley corresponding say to three revolutions.

When a pull is produced on the strap, the pulley on rotating causes the tubular shaft 19 to be rotated with the plate 21 (Fig. 2) which by aid of the pawl 29 engaged in the teeth of ratchet-wheel 13, causes the said ratchet-wheel to be rotated with the nave 7, the plate 6 and consequently the spool 1 attached to said plate.

The mechanism just described, consequently, acts as a driving mechanism to cause the rotation of the spool, which rotation as it will hereinafter be explained is used for the winding up of the cord.

The tubular rod 28, passing axially within the tubular shaft 19 carries, adjacent to the pulley 40, a little grooved roller 50 in the groove of which an arm 51 of a bell-crank lever 52 is engaged, which lever is pivotally supported at 53 on a bracket 54 making part of the arm 48 already described. From the second end of lever 51—52 a balance 55 is suspended, said balance comprising a cylinder in which a piston-rod 56 is subjected to the action of a spring (not shown), said rod 56 carrying a ring 57 to which a cord is attached, said cord being acted upon by the fisher as will be described later on.

Owing to this arrangement, when a sufficient pull is exerted on the cord attached to ring 57, the cylinder 55 will be drawn away as soon as the compression of the spring acting on the rod 56 has attained a given value. The pull on the cord causes then the bell-crank lever 51—52 to oscillate on its pivot 53 thus displacing the roller 50 axially together with the tubular rod 28. As a result, the cross-piece 27 mounted on the opposite end of the tubular rod 28 is moved towards plate 21 and, sliding on the pins 26, butts against the enlarged ports of said pins thus causing the ring 23 to be displaced axially in the cavity 22 of plate 21 in such a manner that the inclined face 24 of ring 23 acts upon the corresponding face 25 of the pawls 14 which are thus released from the teeth of ratchet-wheel 17.

Simultaneously the cross-bar 33, bridging two arms of cross-piece 27, acts upon the arm 31 of pawl 29, causes said pawl to oscillate on its pivot between the projecting lugs of plate 21 and releases the end 30 of said pawl from the teeth of ratchet-wheel 13. The pull on balance 55 consequently releases simultaneously pawls 14 from the teeth of ratchet-wheel 17 and pawl 29 from the teeth of ratchet-wheel 13, thus disconnecting the spool 1 from its internal elements.

The mechanism just described acts consequently as a clutch adapted to release the spool 1 from its actuating elements for the purpose of the free winding off of the cord carried by said spool.

When the pull on balance 55 is released, the parts are returned in the position shown in the drawing (Figs. 1 and 2) by means of a spring 58 (Fig. 2) coiled around the tubular rod 28 within the spool 1, said spring resting at one end against a collar 59 provided inside of the tubular shaft 19 and at the other end against the cross-piece 27.

Rod 38, passing axially within the tubular rod 28 ends, in the part adjacent to roller 50, in the shape of a fork 60 (Fig. 1) adapted to slide on the square end of a shaft 61 actuating a meter 62 carried by bracket 48, said fork being adapted by its cooperation with shaft 61 to rotate said shaft whatever may be the axial position of the fork relatively to the end of the shaft.

To the rod 38 is connected, in the part adjacent to fork 60, a bell-crank lever 62—63 pivotally supported at 64 on a bracket 65 carried by the bracket 48. The arm 63 of said bell-crank lever is connected to a balance 66 similar to balance 55 already described and comprising also a cylinder containing a piston-rod 67 which is subjected to the action of a spring; rod 67 of said balance is connected by a chain or other similar element 68 to the ring 57 at the end of piston-rod 56 of balance 55. The length of said connection 68 is such that a pull on balance 55 only causes a displacement of balance 66 after balance 55 has been moved for a given quantity. When such a displacement takes place, lever 62—63, on oscillating on its pivot 64, displaces axially the rod 38 which causes the part 39, at the end of the rod, to press against the fork 37 of lever 34 in such a manner that said lever, oscillating on its pivot between the lugs of plate 21, causes the brake strap 35 to be tightened on the annular projection 36 of ratchet-wheel 13. And as the said ratchet-wheel makes part of nave 7, the tightening of the strap 35 on the periphery of ring 36 results in the braking of spool 1 when said spool is rotating freely under the action of the unwinding cord.

The apparatus is further provided with the auxiliary elements hereinafter described, the functions of which will be indicated in the explanation of the operation of the device.

The tubular frame 8 carries at some distance from the spool 1, a barrel or spring box 69 cooperating with an arm 70 bodily connected to a plate 71 closing the spring-box laterally.

Arm 70 supports at its upper end a horizontal rod 71 along which a support is adapted to slide by aid of a roller 72, said support carrying a pulley 73 adapted to oscillate in any direction and acting as a guide for the cord 74 coming from the spool 1. The rod 71 is provided laterally with a spring 75 to which a bell 76 is suitably fixed. This device comprising the pulley 73, rod 71, arm 70, spring box 69 and bell 76 constitutes a yielding resistance adapted to yield in case of an abnormal tension of the cord and also to produce an alarm when such a tension occurs.

As already stated the puppet 10 is fixed to the support 12 by aid of a bolt 11 (Fig. 1.) The tightening of this bolt is such that the puppet can eventually rotate on the support 12. However, in order to prevent such a rotation under the normal pull of the cord 74 on the spool 1, the puppet 10 is subjected to the action of a regulator or tension controlling device shown separately in Fig. 7. The said device comprises a kind of box 77 adapted to be fixed at a suitable place in the bark or boat by means of a screw 78. A spring blade 79 is fixed at one end in the said box and is subjected to the pressure of a block 80 adapted to be displaced along the blade, the second end or free end of which presses against a hook 82 which is introduced between the spring blade and the inclined face 83 formed at the open end of the box 77. The pressure of the spring blade 79 upon the hook 82 is consequently variable with the position of the pressure block 80 relatively to the end of the blade; and said pressure will be the greatest when the block will be adjacent to the end of the blade resting on hook 82; if the hook 82 is connected to the apparatus, for example to the tubular frame 8, it will act as a resistance preventing the rotation of the puppet 10 on its support 12 so long as the force tending to cause said rotation will not be greater than the pressure produced by the blade 79 upon the hook 82.

The apparatus is mounted in practice by aid of the support 12 on the boarding or planking of the bark or boat 86 (Fig. 8) which is used in fishing. The resistance box 77 is fixed say on the same boarding as indicated at 87, at a distance of about 1.200m from the apparatus. A wire or cord 88 (Fig. 8) is fixed at one end to the ring of hook 82 (Fig. 7) and at the other end to a ring 89 (Fig. 2) attached to the tubular frame 8 in the proximity of the spring-box 69. The position of the apparatus must be such that the dial of the meter 62 be in front of the fisher 90 operating the oars 91 of the boat.

One object of the invention being to secure means whereby the most important operations during fishing can be executed without the aid of the fisher's hands, a treadle (not shown) is preferably used, said treadle being located at the place where the fisher's foot normally rests during the operation of the oars and said treadle is connected by a cord to the ring 57 at the end of rod 56 of balance 55.

The cord wound on the spool 1, and coming from the lower part of the spool, is passed around the pulley 73 and conveniently weighted. If it is then let off, it takes an inclined position between the vertical and the horizontal, maintaining a given angle of action upon arm 70. The spool 1 being at rest, an increased tension of the fishing cord will cause an angular movement of arm 70 with a corresponding tension of spring 69 but as soon as the tension will be released, arm 70 will return to its position thus causing the bell 76 to ring if the variation of tension occurs more or less suddenly.

To unwind the cord 74 from the spool 1 and consequently to effect the launching of the cord or to increase its depth of immersion, it is sufficient to depress the treadle already mentioned. On account of the pull thus produced on balance 55, the bell crank lever 52—51 acting in the groove of roller 50 moves the tubular rod 28 to the left thus releasing pawl 29 from ratchet-wheel 13 as already described. The pull being increased, the ring 23 also releases the pawls 14 from the ratchet-wheel 17 in such a manner that the spool may rotate freely on the tubular frame. The chain 68 connecting balance 55 to balance 66 is then under tension without however causing the operation of balance 66. The spool 1, rotating freely, the cord 74 unwinds more and more rapidly as the weight of the unwound length increases.

Should then the pressure on the treadle be released, the spring 58 surrounding the tubular rod 28, would return suddenly the cross-piece 27 in its original position thus causing the re-engagement of pawl 29 in ratchet-wheel 13 and of pawls 14 in ratchet wheel 17 under the action of the springs 16. This would result in the sudden stopping of the rotation of spool 1 which could be detrimental to the apparatus. It is in order to prevent this inconvenience that use is made of the brake 35.

During the rotation of the spool 1, the plate 3 in which the square end 39 of rod 38 is engaged, causes the rotation of said rod which controls the meter 62 in such a manner that the length of the unwound cord can be observed at any moment on the dial of said meter 62. When the desired length is attained, a supplemental pressure is exerted upon the pedal connected to balance 55.

Chains 68 being then under tension, the balance 66 is acted upon which causes a displacement of rod 38 to the left; as a result the part 39 at the end of said rod acts upon the fork 37 at the end of lever 34 thus tightening the brake 35 upon the annular projection 36. This braking action being graduated, the rotation of spool 1 is stopped progressively without shocks until, the spool being completely stopped and the treadle released, balances 55 and 66 return to their original position. The spool 1 is then again connected to its tubular shaft 19 and is ready to wind up the cord when desired. This can be effected by a succession of pulls on the strap 45 surrounding the pulley 42. Under the action of said pull, the pulley is rotated with the tubular shaft 19. A single pull on the strap 45 being insufficient to cause the winding up of the desired length of the cord, or to withdraw the same entirely out of the water, the pull on the strap is repeated so long as necessary. As already stated the pull on the strap 45 produces a rotation of about three revolutions of the pulley 40, which results in the winding up of the spring 44. Consequently if the strap 45 is released after a first pull, it is again wound around the pulley which is then rotated by the spring in opposite direction together with the tubular shaft 19. This rotation however does not affect the position of spool 1 as, at this moment, the end 30 of pawl 29 slides along the teeth of ratchet-wheel 13 whilst the said ratchet-wheel is kept at rest together with the spool 1 by the action of pawls 14 in the teeth of ratchet-wheel 17, which teeth are reversed relatively to the teeth of ratchet-wheel 13 (Fig. 5). A succession of pulls on the strap 45 will thus allow the winding up of any desired length of the cord on the spool 1.

The apparatus described secures consequently the possibility of launching the cord merely by depressing the treadle controlling the balance 55; it further makes it possible to determine the depth of water in which it is desired to fish (when the boat is at rest) or to vary the immersed length of the cord according to the requirements of the fishing operation.

During this operation the variations of tension of the cord can be easily observed by aid of the arm 70 and any dangerous tension can be avoided by the use of the resistance box 77 which releases the frame of the apparatus and allows its rotation on the support 12 in case the tension on the cord exceeds a given limit.

In order to prevent that even in such case, a dangerous tension could be exerted on the cord 74 the apparatus may be arranged so as to disconnect the spool 1 from its tubular shaft after the rotation of the puppet 10 on the support 12. To this end the bracket 48 may be provided with a lever 92 pivotally mounted at 93 (Fig. 6) and having its upper end 94 engaged in the groove of roller 50. The said lever 92 is then connected by a chain 95, provided with a balance 96, to a screw or other similar element 97 fixed to the support 12. When the puppet 10 is then rotated after the release of the resistance box 77, the chain 95 is put under tension and the lever 92 is caused to oscillate thus displacing the tubular rod 28 axially and disconnecting the spool from its shaft by means of the cross-piece 27 acting upon pawls 29 and 14.

Any danger of breaking the cord is thus absolutely avoided, as it is then allowed to unwind at any speed whatever.

What I claim is:

1. In a fishing tackle of the kind described, in combination, a spool or drum, a frame at the end of which said spool or drum is rotatably supported, a tubular shaft mounted within said frame, a clutching mechanism contained within the central part of the spool or drum, whereby the said spool can be connected with the tubular shaft or disconnected therefrom, means whereby the said tubular shaft can be rotated alternately in reverse directions, and means including a rod passing through the tubular shaft for operating said clutching mechanism as desired.

2. In a fishing tackle of the kind described, in combination, a spool or drum, a cord wound around said spool or drum, a frame at the end of which said spool or drum is rotatably supported, a tubular shaft mounted within said frame, a clutching mechanism contained within the central part of the spool or drum, whereby the said spool can be connected to the tubular shaft to wind up the cord on the spool or drum or disconnected therefrom, and prevented from rotation in a reverse direction or released so as to rotate freely to unwind the cord from the spool or drum, and means including a rod passing through the tubular shaft for operating said clutching mechanism as desired.

3. In a fishing tackle of the kind described, in combination, a spool or drum, a cord wound around said spool or drum, a frame at one end of which said spool or drum is rotatably supported, a tubular shaft mounted within said frame and ending within the central part of the spool or drum, a clutching mechanism contained within the central part of the spool or drum, actuating means for said clutching mechanism, the said actuating means being also contained in the central part of the spool or drum, means for rotating the tubular shaft, the said means cooperating with said shaft at the second end of the frame remote from the spool carrying end, a rod extending axially within the tubular shaft, the said rod cooperating with the clutching mechanism actuating means, and means whereby the said rod may be acted upon to control the said actuating means.

4. In a fishing tackle of the kind described, in combination, a spool or drum, a cord wound around said spool or drum, a tubular frame at one end of which said spool or drum is rotatably supported, a tubular shaft mounted within the said tubular frame and adapted to rotate therein, said tubular shaft ending at one end within the central part of the spool or drum and at the other end outside of the tubular frame, means whereby the spool or drum can be rotated in one direction by the said tubular shaft, the said means being contained within the central part of the spool or drum, means for rotating the said tubular shaft in reverse directions, the said means cooperating with said shaft at the end remote from the spool or drum, means for holding the spool or drum at rest when the tubular shaft is rotated in a given direction and means whereby the spool may be disconnected from the tubular shaft and arresting means to rotate freely on the end of the tubular frame.

5. In a fishing tackle of the kind described, in combination a spool or drum, a cord wound around said spool or drum, a tubular frame at one end of which said spool or drum is rotatably supported, a tubular shaft mounted within the said tubular frame, a clutching mechanism contained within the central part of the spool or drum, means for actuating said clutching mechanism, the said means comprising a tubular rod extending axially within the tubular shaft, a pulley mounted on the tubular shaft at the end remote from the spool or drum, a strap surrounding the said pulley whereby the tubular shaft may be rotated in one direction, a spring-box cooperating with said pulley whereby the tubular shaft may be rotated in a reversed direction, means whereby the tubular rod can be displaced axially within the tubular shaft, a rod extending axially within the tubular rod, the said rod being rotated by the rotation of the spool or drum and a meter controlled by the rotation of said rod.

6. In a fishing tackle of the kind described in combination a spool or drum, a cord wound around said spool or drum, a tubular frame at one end of which said spool or drum is rotatably supported, means for rotating the said spool or drum to wind up the cord around the spool or drum, a clutching mechanism whereby the spool or drum may be disconnected from its rotating means, a braking device contained within the spool or drum whereby the rotation of said spool may be stopped whilst the cord is unwinding, said braking device cooperating with the clutching mechanism, and means passing through the tubular frame for selectively controlling the brake and clutching mechanism.

7. In a fishing tackle of the kind described, in combination, a spool or drum, a cord wound around said spool or drum, a frame at one end of which the said spool or drum is rotatably supported, yielding means cooperating with the cord whereby any variation of tension of the cord may be observed, means for winding up the cord around the spool or drum, and means whereby the spool or drum may rotate freely to unwind the cord.

8. In a fishing tackle of the kind described, in combination, a spool or drum, a cord wound around said spool or drum, a frame at one end of which the said spool or drum is rotatably supported, means for winding up the cord around the spool or drum, means whereby the spool or drum may rotate freely to unwind the cord, a meter, means whereby the rotation of the spool or drum is transmitted to the meter, a support, on which the frame is rotatably mounted and a resistance-box whereby the frame is maintained in a given position on its support so long as the tension of the angle remains normal but is adapted to rotate an said support as soon as the tension on the cord exceeds a given limit.

9. In a fishing tackle of the kind described, in combination, a spool or drum, a cord wound around said spool or drum, a frame at one end of which the said spool or drum is rotatably supported, means for winding up the cord around the spool or drum, means whereby the spool or drum may rotate freely to unwind the cord, a meter, means whereby the rotation of the spool or drum is transmitted to said meter, a support on which the frame is rotatably mounted, a resistance-box whereby the frame is maintained in a given position on its support so long as the tension of the cord remains normal but is adapted to rotate on said support as soon as the tension on the cord exceeds a given limit and means whereby the spool or drum is adapted to rotate freely on the frame when the action of the resistance-box is released.

In testimony whereof I have affixed my signature in presence of two witnesses.

BARON EMMANUEL COPPENS d' EECKENBRUGGE.

Witnesses:
J. BIDER,
F. Y. ZALRENY.